United States Patent

[11] 3,579,741

[72] Inventor William H. Schwartz
University Heights, Ohio
[21] Appl. No. 773,237
[22] Filed Nov. 4, 1968
[45] Patented May 25, 1971
[73] Assignee Lester Engineering Company
Cleveland, Ohio

[54] MACHINE AND CLAMP FORCE CONTROL SYSTEM THEREFOR
18 Claims, 5 Drawing Figs.
[52] U.S. Cl. ............................................. 18/30,
18/16, 164/154
[51] Int. Cl. .............................................. B29f 1/06
[50] Field of Search...................................... 18/30
(CK), (LA), (KO), (LV), (CR), (LT), (CS),
(LM), (LKM), 16 (C), (DIG. 45); 164/154
(Annear); 65/1

[56] References Cited
UNITED STATES PATENTS
3,423,502 1/1969 Stimpson..................... 18/30
2,790,204 4/1957 Edwards...................... 18/30
2,433,132 12/1947 Lester........................ 164/154
2,498,264 2/1950 Goldhard.................... 18/30
3,464,245 9/1969 Dowsing...................... 72/8

Primary Examiner—Charles W. Lanham
Assistant Examiner—A. L. Havis
Attorney—Oberlin, Maky, Donnelly & Renner ABSTRACT: A machine such as a diecasting or injection molding machine having a frame with a bed and movable die plate supporting relatively movable molds or dies, such molds or dies being closed by a clamp cylinder to obtain a clamping tonnage, die height adjustment which is operative to control the relative position of the relatively movable dies or molds, and a control system which measures the force or tonnage exerted by the clamp and compares the measured tonnage against a preset or predetermined tonnage which then automatically energizes the die height adjustment mechanism so that the clamp tonnage will be substantially the same and correct for each cycle of operation of the machine and will not vary due to mold growth or shrinkage as temperatures change.

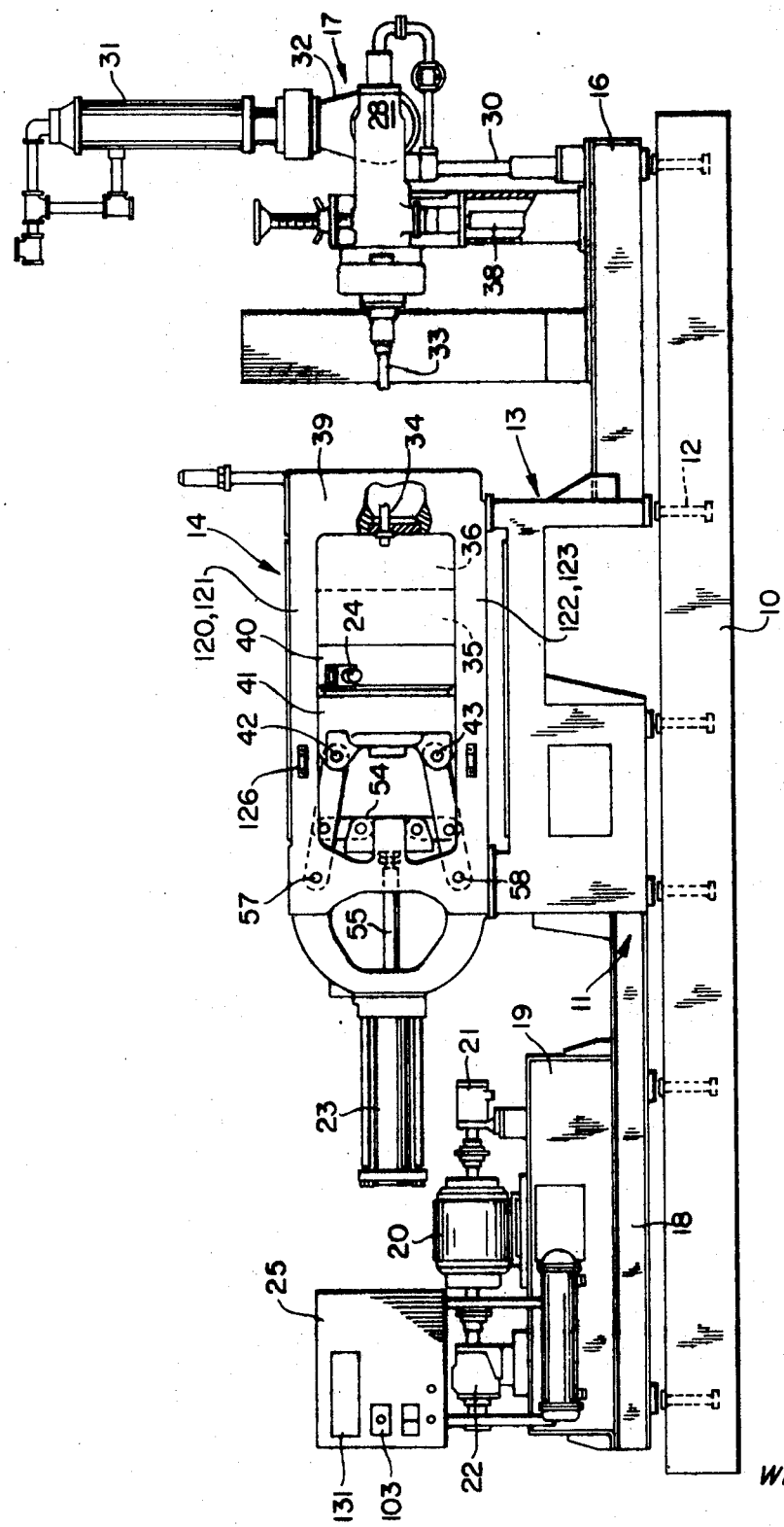

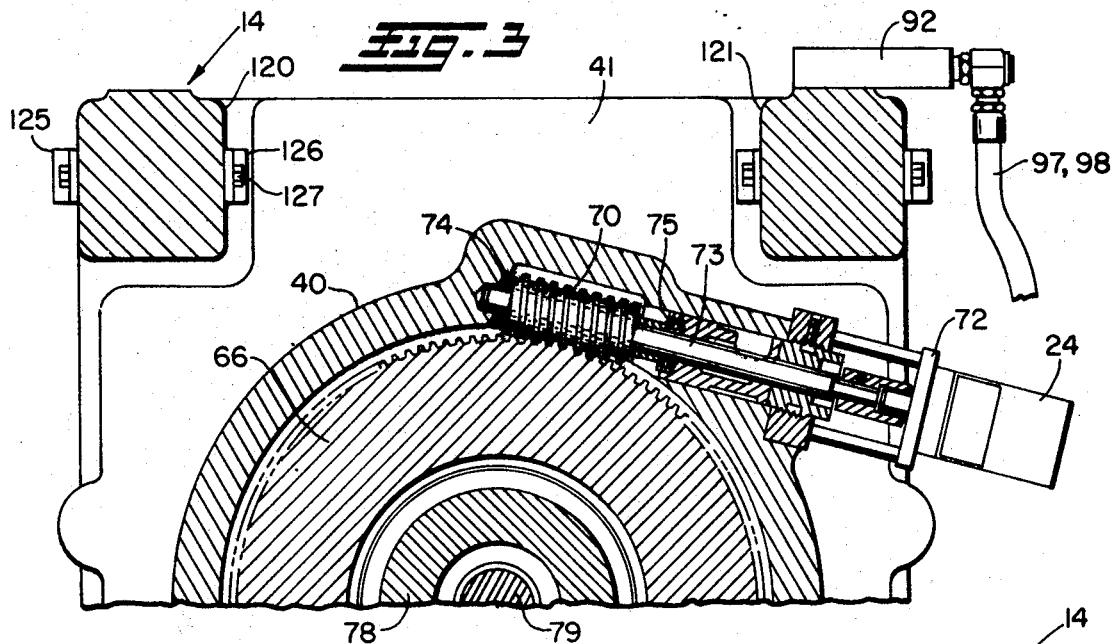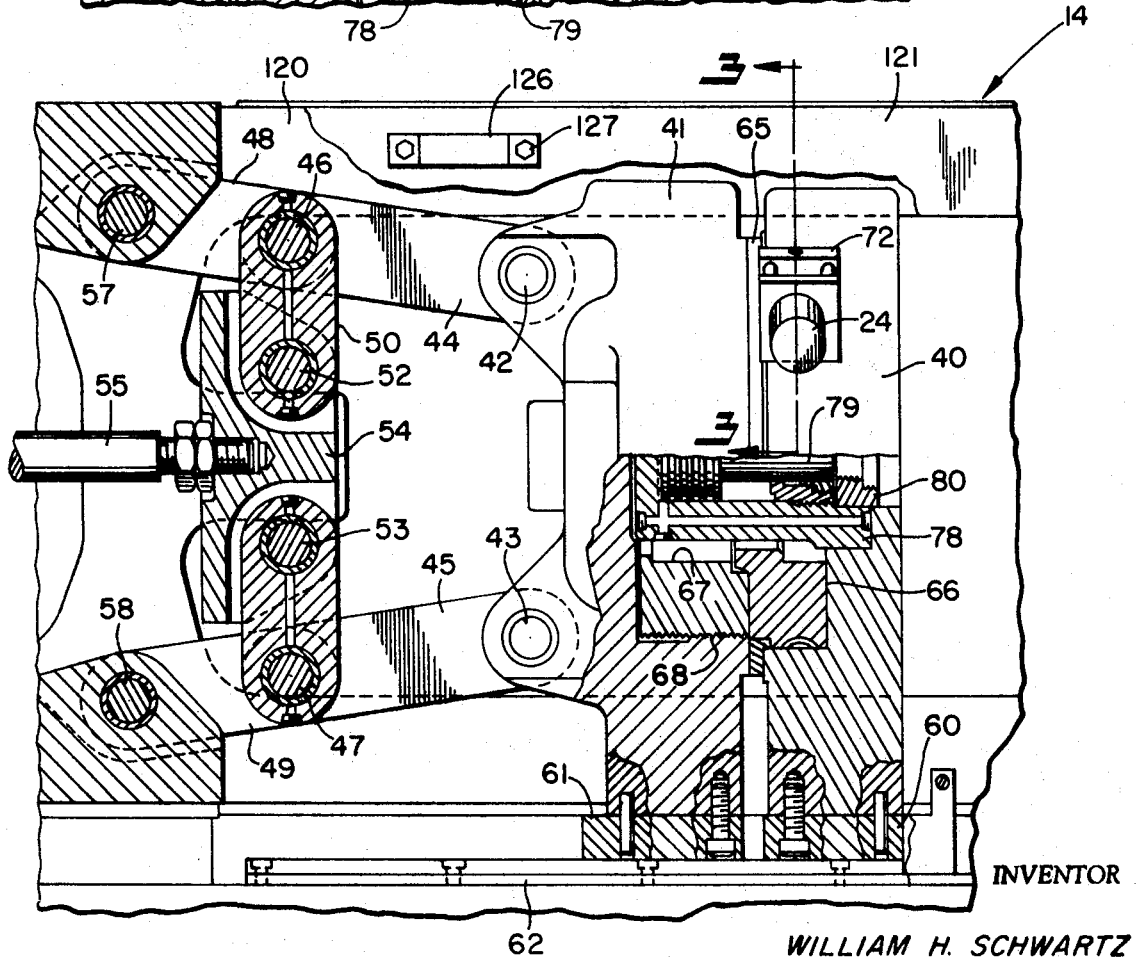

INVENTOR
WILLIAM H. SCHWARTZ

MACHINE AND CLAMP FORCE CONTROL SYSTEM THEREFOR

This invention relates generally as indicated to a machine and clamp force control system therefor and more particularly to a machine such as a die casting machine or an injection molding machine in which separable molds or dies are clamped together and metal or plastic is then forced into such thus formed mold.

Machines of this type have a tonnage rating which can, for example, be as high as 400 or more tons. The machine tonnage is a function of the clamping cylinder operating a toggle system through the linkage stall point such that at final lockup the links are positioned nearly in line. If the mold height or dimension should increase due to a temperature rise, the clamping cylinder may not provide sufficient force to carry the linkage through the stall point.

To accomplish proper lockup, a die-height-adjusting screw must be backed off. Conversely at the start of a run with the mold cold, the adjusting screw must be brought forward to obtain proper lockup. In most machines of this type, the adjustment of the die height is done manually and by trail and error.

If the die height is not adjusted fairly accurately improper lockup will occur which may mean on the one hand a flashing of the mold or on the other hand undue load or strain on the machine itself. The frame of the machine may, for example, actually stretch thirty- to forty-thousandths of an inch during the lockup. Excessive tonnage can thus damage the machine and its parts as well as the expensive molds or dies.

Since during a run the temperature of the molds or dies may increase from machine cycle to machine cycle, it is important that continual monitoring of the tonnage be accomplished and that accurate adjustments be made after each cycle if required. This then ensures proper lockup for each cycle of operation of the machine irrespective of mold dimensional variations.

It is accordingly a principal object of the present invention to provide a machine of the type aforesaid which will automatically adjust the die height to compensate for mold dimensional changes to obtain uniform desired clamping tonnage for each cycle of the machine.

Another important object is the provision of a clamp force control system for such machines which will accurately sense the clamp force exerted on the molds or dies, compare such force to a determined setting and adjust the position of the mold or die portions accordingly.

Another object is the provision of a machine and clamp force control system therefor which enables the setting of the machine tonnage by a simple dial or other instrument adjustment.

Yet another object is the provision of such system which can be used to determine the magnitude and distribution of the forces on the tie rods or columns of the machine.

Still another object is the provision of a control system for such machines which in the automatic operational mode will adjust the die height continuously as required to maintain the die clamp force within a relatively narrow range of a predetermined optimum clamp force value.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In said annexed drawings:

FIG. 1 is a side elevation partially broken away and in section of a machine in accordance with the present invention;

FIG. 2 is an enlarged fragmentary detail view partially broken away and in section of the clamping toggle system and the die height adjustment mechanism;

FIG. 3 is a fragmentary vertical section through the die height adjustment mechanism taken substantially on the line 3-3 of FIG. 2;

Figure 4:
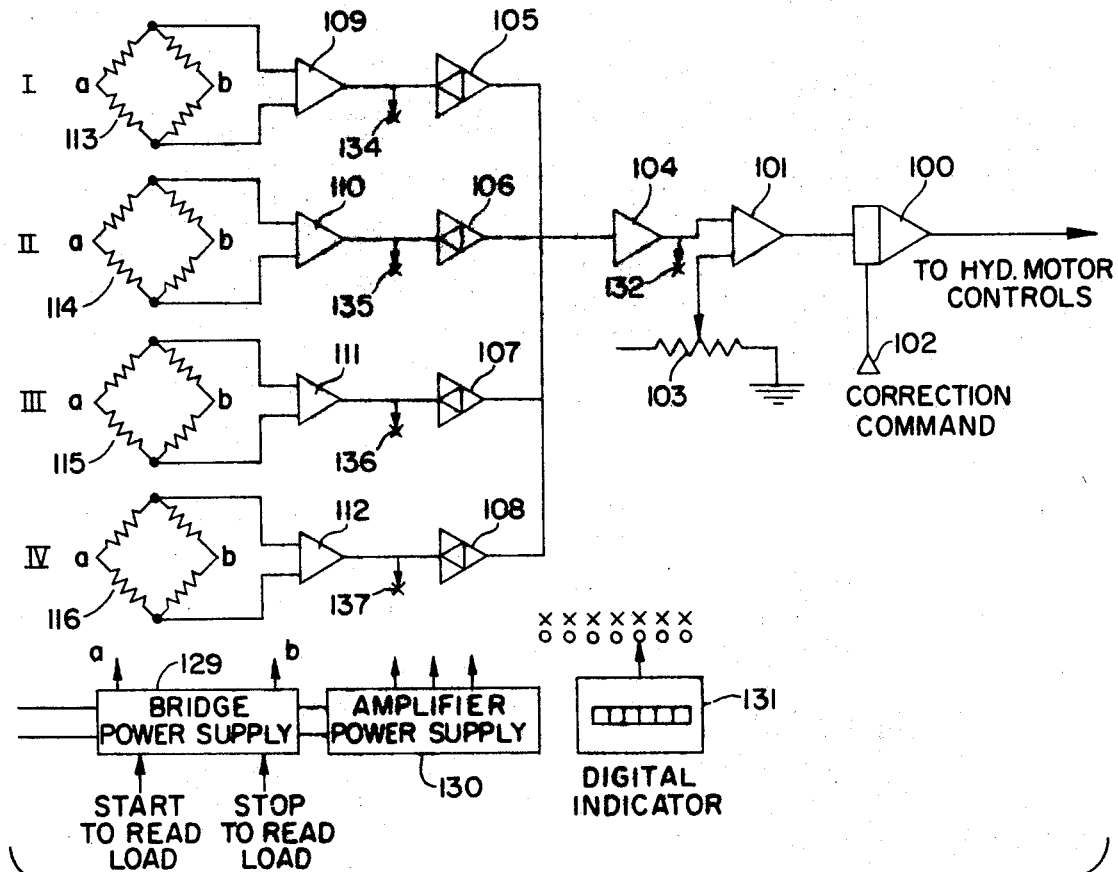
FIG. 4 is a schematic wiring diagram of the force control system.

Referring now more particularly to the drawings and first to FIG. 1, there is illustrated a machine in accordance with the present invention. The illustrated machine is a die casting machine but it will be appreciated that the present invention may apply to other types of machines such as injection molding machines or any machine having relatively movable molds or dies.

The machine includes a base 10 on which the horizontally extending base frame 11 is supported by suitable leveling lug assemblies 12. The base frame includes an upstanding center portion 13 supporting the main clamping frame 14 which may, for example, be a one-piece cast steel alloy. Alternatively, a frame assembly may be employed using tie rods or bars extending longitudinally thereof.

The base frame includes an extension 16 for the shot or injection unit 17 and an extension 18 supporting the hydraulic base 19 on which is mounted the main drive motor 20 which operates shot pump 21 and double pump 22, the latter operating clamp cylinder 23 and hydraulic motor 24 driving the die height adjustment. A control panel 25 is also mounted on the hydraulic base 19.

The shot or injection assembly 17 includes a main shot piston-cylinder assembly 28 to which hydraulic fluid is supplied through line 29 and telescoping tube 30. A prefill oil reservoir 31 and prefill valve 32 are provided, the latter shifting at certain pressure to shut off oil from the prefill tank 31. The shot piston-cylinder assembly operates initially at high velocity and then at high pressure and drives the plunger 33 forwardly through metal cylinder 34 to inject, for example, molten aluminum into die cavities formed in separable mold halves 35 and 36.

The injection assembly 17 may be raised or lowered by hydraulic jack 38 and locked in a vertically adjusted position depending on the height at which the molten metal is to be injected into the mold.

During the injection operation, the mold halves 35 and 36 are clamped together by link piston-cylinder assembly 23. The mold half 36 may be mounted on fixed die plate or bed 39 of the frame 14 while the mold half 35 is mounted on movable die plate 40. The moving die plate 40 is connected to adjusting die plate 41.

Referring now additionally to FIG. 2, it will be seen that the adjusting die plate has pivotally connected thereto at vertically spaced pivots 42 and 43 pairs of long links indicated at 44 and 45. The opposite ends of these pairs of links are pivoted to pins 46 and 47, respectively, to which are also pivoted pairs of back links 48 and 49 as well as cross links 50 and 51, respectively. The cross links are also pivoted at 52 and 53, respectively, to yoke 54 mounted on the rod 55 of the link cylinder assembly 23. The back links 48 and 49 are pivoted at 57 and 58, respectively, which pivots are fixed on the frame 14.

The movable die plate 40 is provided with a runner 60 while the adjusting die plate 41 is provided with runner 61. Such runners are supported and guided in gibs 62 mounted internally of the machine frame supporting and guiding the die plates for movement along the frame.

Secured in the movable die plate 40 by retaining ring 65 is a worm wheel 66 to which is secured adjusting screw 67 threadedly connected at 68 to adjusting die plate 41. It can thus be seen that rotation of the screw 67 with respect to the adjusting die plate will move the movable die plate toward or away from such adjusting die plate.

Rotation of the worm wheel 66 and the attached adjusting screw 67 is obtained by worm gear 70 seen more clearly in FIG. 3 driven by high torque hydraulic motor 24. The hydraulic motor is mounted on bracket 72 and the output shaft is connected to worm gear shaft 73 journaled at 74 and 75 in the movable die plate 41. The hydraulic motor 24 is of the high torque type and is reversible so that the screw may be rotated in either direction.

The center of the movable die plate 40 is provided with an ejector cylinder 78 in which is provided an ejector piston and rod assembly 79 having on the end thereof an ejector head 80 to which the ejector mechanism for the mold or die attached to the movable die plate 40 is connected. When the molds or dies are open, the ejector piston-cylinder assembly will be energized to eject the casting or molded object from the movable die.

Figure 5:
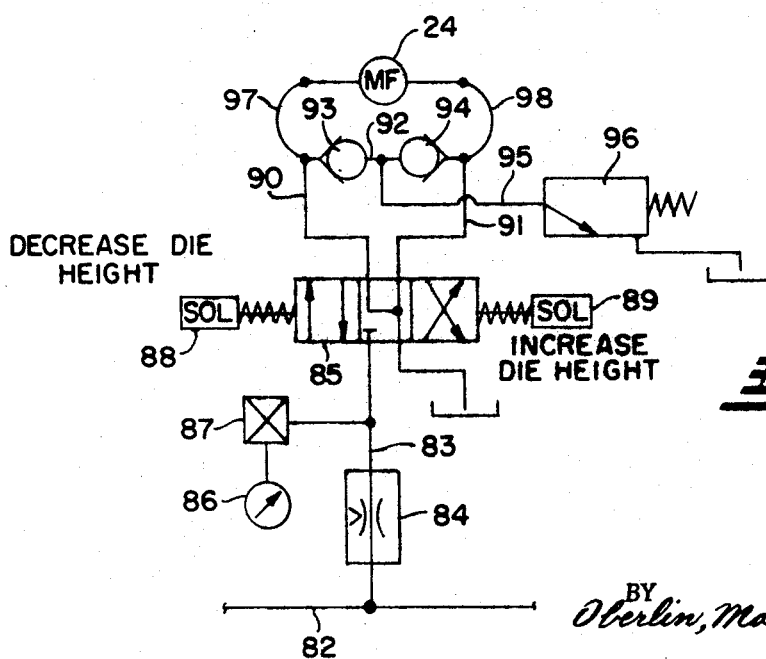
FIG. 5 is a schematic diagram of the hydraulic motor controls.

Referring now to FIG. 5, it will be seen that the high torque reversible hydraulic motor 24 may be driven from hydraulic line 82 connected to the dual pump 22. Branch line 83 passes through flow control valve 84 and into four-way double-solenoid valve 85. A 0 to 2,000 p.s.i. gauge 86 is operated through needle valve 87 leading from the branch line 86. The spring centered double solenoid valve 85 is shown in the closed position and solenoid 88 may be energized to rotate the hydraulic motor in one direction to rotate the adjusting screw in a direction to decrease the die height or move the movable die plate 40 toward the adjusting die plate 41. Conversely, the solenoid 89 may be energized to rotate the hydraulic motor and thus the adjusting screw in a direction to increase the die height or to move the movable die plate 40 away from the adjusting die plate 41.

Lines 90 and 91 lead from the valve 85 to manifold 92 which includes check valves 93 and 94. Connected to the manifold between the check valves is a line 95 leading to relief valve 96. Flexible hoses 97 and 98 lead to the ports of the motor from the manifold.

Control of the solenoids 88 and 89 is obtained by the electrical control system seen more clearly in FIG. 4. The solenoids are controlled directly from a voltage controlled timing and control module 100 which is operated in an automatic mode from load to set point comparator 101 or in manual mode directly by the operator through correction command 102. The set point may be obtained on a dial indicated at 103 and a comparison made to the output of the summing amplifier 104. The summing amplifier 104 is connected to four peak reading memory packs 105, 106, 107 and 108, each of which is connected to low level differential amplifiers 109, 110, 111 and 112, respectively. Such amplifiers are connected to opposite points on strain cell transducers 113, 114, 115 and 116, respectively, which are mounted on the longitudinal elements or columns of the frame 14. Such amplifiers condition and enlarge the output of the transducers.

As seen perhaps more clearly in FIGS. 1, 2 and 3, each of the four elements or columns 120, 121, 122 and 123 of the frame are provided with two strain cell transducers as indicated at 125 and 126 in FIG. 3 with each cell being on opposite sides of the element. Accordingly, the machine is provided with eight such strain cell transducers altogether each of which may include a full four-leg bridge. However, in the illustrated embodiment, only two legs of each transducer are employed and such transducers on each leg are connected together to form the full four-leg bridges seen at 113 through 116 in FIG. 4. The strain cells are installed simply by fastening them in place on the columns or bars of the frame with suitable fasteners as indicated at 127 which are placed in a line in the direction of the applied loads. The use of two strain cell transducers, one on each side of the column, compensates for bending of the column under high tensile load so that only tensile elongation is indicated.

Bridge power supply is obtained from source 129 while amplifier power supply is obtained from source 130.

A digital indicator 131 may be employed to obtain a direct reading of the output of the summing amplifier as indicated at 13 or the output of the individual amplifiers 109 through 112 as indicated at 134 through 137. The digital indicator can thus monitor the performance of each transducer as well as the sum of the transducers so that the operator can check for good die or mold setup to avoid excessively eccentric loads. The operator can then obtain a direct reading of the total load as well as individual readings of the distribution of that load in the elements of the machine.

In operation, with the ejector retracted and the molds open by retraction of the link piston-cylinder assembly 23, the machine now closes exerting a clamping tonnage on the mold or die portions and the shot into the mold is made. At this point, the control system takes a reading of the tonnage by measuring the elongation of the frame members and retains this measurement through the peak reading memory packs.

The machine then proceeds through its cycle and the link piston-cylinder assembly 23 retracts. The ejector then moves forward to eject the casting or molded article and the shot piston retracts. Now with the mold open, the load to set point comparator will compare the output of the summing amplifier with the output of the set point dial 103. If the output of the transducers is more than the set point, a reduced command will be sent to the hydraulic control valve 85 through the timing and control module 100. If it is less, then it will be an increase command. The duration of each command, which of course, controls the amount of the adjustment, can be controlled directly from the control panel 25. As an additional safety, overload alarms are provided and in the case of excessive overloads, these alarms will reverse the main link cylinder assembly 23 and may also stop the material flow into the dies.

After the commanded adjustment is made to the die height, the machine will then proceed through its next cycle. In the automatic operational mode, the control system will adjust the screw continuously as required to maintain the die clamp force within a relatively narrow range of the preset optimum value. This avoids machine strain, die wear and ensures proper clamping tonnage for each operational cycle of the machine.

Other modes of applying the principles of the invention may be employed, change being made as regards the details described, provided the features stated in any of the following claims or the equivalent of such be employed.

I, therefore, particularly point out and distinctly claim as my invention:

I claim:

1. A machine having a frame, a bed and movable die plate mounted on said frame adapted to support relatively movable dies, power means operative to move such dies together, die height adjustment means, means operative to measure the force exerted on said frame by said power means, and means operative to compare such measured force against a predetermined optimum force to obtain a differential, and means responsive to said differential to energize said die height adjustment means for opening or closing the dies to make the measured force equal to the optimum force.

2. A machine as set forth in claim 1 wherein said die height adjustment means comprises a motor-driven screw.

3. A machine as set forth in claim 1 wherein said means operative to measure the force exerted by said power means comprises strain cell transducers mounted on the longitudinal elements of said frame.

4. A machine as set forth in claim 1 wherein said means operative to measure the force exerted by said power means comprises strain cell transducers mounted on the longitudinal elements of said frame, said strain cell transducers being mounted on opposite sides of each longitudinal element.

5. A machine as set forth in claim 1 wherein said means operative to compare such measured force against a predetermined force comprises a load to set point comparator operative to give an increase or decrease command to said die height adjustment means when said relatively movable dies are open.

6. A machine as set forth in claim 1 wherein said die height adjustment means comprises a worm-driven screw, and a high torque reversible hydraulic motor operative to drive said worm.

7. A machine as set forth in claim 1 wherein said die height adjustment comprises a reversible hydraulic motor-driven screw, a double-solenoid valve operative to control said motor and the direction of rotation thereof, each solenoid being selectively energized according to the comparison obtained.

8. A machine as set forth in claim 1 wherein said relatively movable dies include a fixed and movable die, the latter including two relatively movable elements the spacing of which is controlled by said die height adjustment means.

9. A machine as set forth in claim 1 wherein said frame includes four longitudinal members, strain cells mounted on each member, and a digital indicator operative to measure the long on each member or all members.

10. A clamp force control system for machines of the type having relatively movable mold portions, means operative to sense the clamp force exerted on such mold portions, means operative to compare such force to obtain a differential to a predetermined optimum force, and means responsive to said differential to adjust the position of such mold portions in the machine for opening or closing the mold portions to make the measured force equal to the optimum force.

11. A system as set forth in claim 10 wherein said last mentioned means includes a reversible hydraulic motor-driven screw to adjust the position of such mold portions.

12. A system as set forth in claim 11 including a double-solenoid valve operative to control the extent and direction of rotation thereof.

13. A system as set forth in claim 12 including a flow control valve leading to said double-solenoid valve.

14. A system as set forth in claim 10 wherein said first mentioned means includes strain cells on the frame elements of the machine, and means to record the load on each or all elements.

15. A system as set forth in claim 14 including strain cells mounted on opposite sides of each element.

16. A system as set forth in claim 15 wherein the two strain cells on each element are connected together to form a full four-leg bridge.

17. A system as set forth in claim 10 wherein said last mentioned means comprises a load to set point comparator.

18. A system as set forth in claim 17 wherein said set point is obtained on a dial.